United States Patent
Liu et al.

(10) Patent No.: US 7,424,427 B2
(45) Date of Patent: Sep. 9, 2008

(54) SYSTEMS AND METHODS FOR CLASSIFYING AUDIO INTO BROAD PHONEME CLASSES

(75) Inventors: Daben Liu, Belmont, MA (US); Francis G. Kubala, Boston, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 817 days.

(21) Appl. No.: 10/685,585

(22) Filed: Oct. 16, 2003

(65) Prior Publication Data

US 2004/0230432 A1    Nov. 18, 2004

Related U.S. Application Data

(60) Provisional application No. 60/419,214, filed on Oct. 17, 2002.

(51) Int. Cl.
G10L 15/14 (2006.01)
G10L 15/00 (2006.01)
G10L 17/00 (2006.01)
G10L 11/04 (2006.01)
G10L 21/00 (2006.01)
G10L 11/06 (2006.01)

(52) U.S. Cl. ............. 704/256.1; 704/206; 704/208; 704/210; 704/246; 704/249; 704/256.2

(58) Field of Classification Search .......... 704/206, 704/208, 246, 256.1, 256.2
See application file for complete search history.

(56) References Cited

U.S. PATENT DOCUMENTS

| | | | | |
|---|---|---|---|---|
| 5,475,792 A * | 12/1995 | Stanford et al. | ............. | 704/233 |
| 5,638,487 A * | 6/1997 | Chigier | ............. | 704/253 |
| 5,897,614 A * | 4/1999 | McKiel, Jr. | ............. | 704/208 |
| 6,208,967 B1 * | 3/2001 | Pauws et al. | ............. | 704/256.8 |
| 6,243,680 B1 * | 6/2001 | Gupta et al. | ............. | 704/260 |

OTHER PUBLICATIONS

Leung et al, "A Comparitive Study of Signal Representations and Classification Techniques for Speech Recognition" IEEE International Conference on Acoustics, Speech and Signal Processing, ICASSP'93 27-40 Apr. 1993, vol. (2), pp. 680-683.*

Amit Srivastava et al.: "Sentence Boundary Detection in Arabic Speech," 8th European Conference on Speech Communication and Technology, Sep. 1-4, 2003 in Geneva, Switzerland; 4 pages.

Sreenivasa Sista et al.: "Unsupervised Topic Discovery Applied To Segmentation Of News Transcriptions," 8th European Conference on Speech Communication and Technology, Sep. 1-4, 2003 in Geneva, Switzerland; 4 pages.

(Continued)

Primary Examiner—Richemond Dorvil
Assistant Examiner—Dorothy Siedler (57) ABSTRACT

An audio classification system classifies sounds in an audio stream as belonging to one of a relatively small number of classes. The audio classification system includes a signal analysis component [301] and a decoder [302]. The decoder [302] includes a number of models [310-316] for performing the audio classifications. In one implementation, the possible classifications include: vowels, fricatives, narrowband, wideband, coughing, gender, and silence. The classified audio may be used to enhance speech recognition of the audio stream.

31 Claims, 7 Drawing Sheets

OTHER PUBLICATIONS

Daben Liu et al.: "Online Speaker Clustering," *ICASSP 2003*, vol. 1, pp. 572-575, 2003 Hong Kong.

J. Billa et al.: "Audio Indexing Of Arabic Broadcast News," *ICASSP 2002*; Orlando, FL; May 13-17, 2002; 4 pages.

Scott Shepard et al.: "Newsroom OnTAP—Real-time alerting from streaming audio," Dec.-Jan. 2001 HLT Paper; 2 pages.

Heidi Christensen et al.: "Punctuation Annotation using Statistical Prosody Models," *The Proceedings of Eurospeech*, Denmark, 2001; 6 pages.

Ji-Hwan Kim et al.: "The Use Of Prosody In A Combined System For Punctuation Generation And Speech Recognition," *The Proceedings of Eurospeech*, Denmark, 2001; 4 pages.

Jing Huang et al.: "Maximum Entropy Model For Punctuation Annotation From Speech," *The Proceedings of Eurospeech*, Denmark, 2001; pp. 917-920.

Yoshihiko Gotoh et al.: "Sentence Boundary Detection in Broadcast Speech Transcripts," *Proceedings of the International Speech Communication Association Workshop: Automatic Speech Recognition: Challenges for the New Millennium*, Paris, Sep. 2000; 8 pages.

John Mekhoul et al.: "Speech and Language Technologies for Audio Indexing and Retrieval," *Proceedings of the IEEE*, vol. 88, No. 8, Aug. 2000; pp. 1338-1353.

Francis Kubala et al.: "Integrated Technologies For Indexing Spoken Language," Communications of the ACM, vol. 43, No. 2, Feb. 2000; pp. 48-56.

Sean Colbath et al.: "Spoken Documents: Creating Searchable Archives from Continuous Audio," *Proceedings of the 33rd Hawaii International Conference on System Sciences-2000*; pp. 1-9.

Francis Kubala et al.: "Situation Awareness Contexts for Smart Environments," *Inter-Agency Workshop on Research Issues for Smart Environments*; Atlanta, GA; 2000; 3 pages.

Daben Liu et al.: "Fast Speaker Change Detection For Broadcast News Transcription And Indexing," *The Proceedings of Eurospeech 1999*; Budapest, Hungary; 4 pages.

Daniel M. Bikel et al.: "An Algorithm that Learns What's in a Name," *Machine Learning*, 1999; pp, 1-20.

Richard Schwartz et al.: "Accurate Near-Real-Time Recognition of Broadcast News using Multiple-Pass Search Techniques," *1999 Workshop on Automatic Speech Recognition and Understanding*, Dec. 12-15, 1999; Keystone, Colorado; 6 pages.

Francis Kubala et al.: "Smart Information Spaces: Managing Personal and Collaborative Histories," *Proceedings of the 1998 DARPA/NIST Smart Spaces Workshop*, Jul. 30-31, 1998; 6 pages.

Daben Liu et al.: "Improvements in Spontaneous Speech Recognition," *Proceedings of the DARPA Broadcast News Transcription and Understanding Workshop*; Feb. 8-11, 1998 in Lansdowne, Virginia; 5 pages.

Francis Kubala et al.: "The 1997 BBN Byblos System Applied To Broadcast News Transcription," Cambridge, Massachusetts; 1997; 6 pages.

Hubert Jin et al.: "Automatic Speaker Clustering," *ICFEM*, Chantilly, Virginia; Feb. 1997; 4 pages.

Sean Colbath et al.: "OnTAP: Mixed-media Multi-lingual Language Processing," *Human Language Technology Conference*, San Diego, CA; 2002; 2 pages.

Andreas Stolcke et al.: "Automatic Linguistic Segmentation Of Conversational Speech," *Proceedings of the International Conference on Spoken Language Processing*, vol. 2, Philadelphia 1996; pp. 1005-1008

Scott S. Chen et al.: "Speaker, Environment and Channel Change Detection and Clustering via the Bayesian Information Criterion," in DARPA Speech Recognition Workshop, 1998, 6 pages.

Marti A. Hearst: "Multi-Paragraph Segmentation of Expository Text," in Proceedings of the 2nd Annual Meeting of the Association for Computational Linguistics, New Mexico State University, Las Cruces, NM, 1994, pp. 1-8.

\* cited by examiner

SYSTEMS AND METHODS FOR CLASSIFYING AUDIO INTO BROAD PHONEME CLASSES

RELATED APPLICATIONS

This application claims priority under 35 U.S.C. § 119 based on U.S. Provisional Application Ser. No. 60/419,214 filed Oct. 17. 2002, the disclosure of which is incorporated herein by reference.

GOVERNMENT CONTRACT

The U.S. Government may have a paid-up license in this invention and the right in limited circumstances to require the patent owner to license others on reasonable terms as provided for by the terms of Contract No. DARPA F30602-97-C-0253.

BACKGROUND OF THE INVENTION

A. Field of the Invention

The present invention relates generally to speech processing and, more particularly, to audio classification.

B. Description of Related Art

Speech has not traditionally been valued as an archival information source. As effective as the spoken word is for communicating, archiving spoken segments in a useful and easily retrievable manner has long been a difficult proposition. Although the act of recording audio is not difficult, automatically transcribing and indexing speech in an intelligent and useful manner can be difficult.

Speech is typically received by a speech recognition system as a continuous stream of words without breaks. In order to effectively use the speech in information management systems (e.g., information retrieval, natural language processing and real-time alerting systems), the speech recognition system initially processes the speech to generate a formatted version of the speech. The speech may be transcribed and linguistic information, such as sentence structures, may be associated with the transcription.

Additionally, information relating to the speakers may be associated with the transcription.

Speech recognition systems, when transcribing audio that contains speech, may classify the audio into a number of different audio classifications. The audio classifications may include classifications, such as speech/non-speech and vowel/consonant portions of the audio. The speech recognition system may use the speech classifications when processing the speech signals. Non-speech regions, for example, are not transcribed. Also, whether a vowel or consonant is being spoken may dictate which acoustic model to use in analyzing the audio.

Conventional speech recognition systems may decode an incoming audio stream into a series of phonemes, where a phoneme is the smallest acoustic event that distinguishes one word from another. The phonemes may then be used to classify the audio signal. The number of phonemes used to represent a particular language may vary depending on the particular phoneme model that is employed. For English, a complete phoneme set may include approximately 50 different phones.

One problem associated with generating a complete phoneme set for an incoming audio signal is that the complete phoneme set may be computationally burdensome, particularly when attempting to process speech in real-time.

Thus, there is a need in the art to more efficiently classify segments of an audio signal.

SUMMARY OF THE INVENTION

Systems and methods consistent with the principles of this invention classify audio into broad classes. The broad nature of the classes allows for quick classification. The audio classifications may then be used in performing more detailed speech recognition functions.

One aspect of the invention is directed to a method for classifying an audio signal containing speech information. The method includes receiving the audio signal and classifying a sound in the audio signal as a vowel class when a first phoneme-based model determines that the sound corresponds to a sound represented by a set of phonemes that define vowels. The method also includes classifying the sound in the audio signal as a fricative class when a second phoneme-based model determines that the sound corresponds to a sound represented by a set of phonemes that define consonants. Further, the method includes classifying the sound in the audio signal based on at least one non-phoneme based model.

A second aspect of the invention is directed to a method of training audio classification models. The method comprises receiving a training audio signal and receiving phoneme classes corresponding to the training audio signal. A first Hidden Markov Model (HMM) is trained based on the training audio signal and the phoneme classes. The first HMM classifies speech as belonging to a vowel class when the first HMM determines that the speech corresponds to a sound represented by a set of phonemes that define vowels. A second HMM is trained based on the training audio signal and the phoneme classes. The second HMM classifies speech as belonging to a fricative class when the second HMM determines that the speech corresponds to a sound represented by a set of phonemes that define consonants.

Another aspect of the invention is directed to an audio classification device. The audio classification device includes a signal analysis component that receives an audio signal and processes the audio signal by converting the audio signal to the frequency domain and/or generating cepstral features for the audio signal. The device further includes a decoder that classifies portions of the audio signal as belonging to classes. The classes include a first phoneme-based class that applies to the audio signal when a portion of the audio signal corresponds to a sound represented by a set of phonemes that define vowels. A second phoneme-based class applies to the audio signal when a portion of the audio signal corresponds to a sound represented by a set of phonemes that define consonants. The classes further include at least one non-phoneme class.

A system consistent with another aspect of the invention includes an indexer, a memory system, and a server. The indexer receives input audio data and generates a rich transcription from the audio data. The indexer includes audio classification logic that classifies the input audio data into at least one of a number of broad audio classes, where the broad audio classes include a phoneme-based vowel class, a phoneme-based fricative class, a non-phoneme based bandwidth class, and a non-phoneme based gender class. The indexer further includes a speech recognition component that generates the rich transcriptions based on the broad audio classes determined by the audio classification logic. The memory system stores the rich transcriptions. The server receives requests for documents and responds to the requests by transmitting one or more of the rich transcriptions that match the requests.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

An audio classification system classifies sounds in an audio stream as belonging to one of a relatively small number of classes. In one implementation, seven classes are used: vowels, fricatives, narrowband, wideband, coughing, gender, and silence. The classified audio may be used to enhance speech recognition of the audio.

Exemplary System

Figure 1:
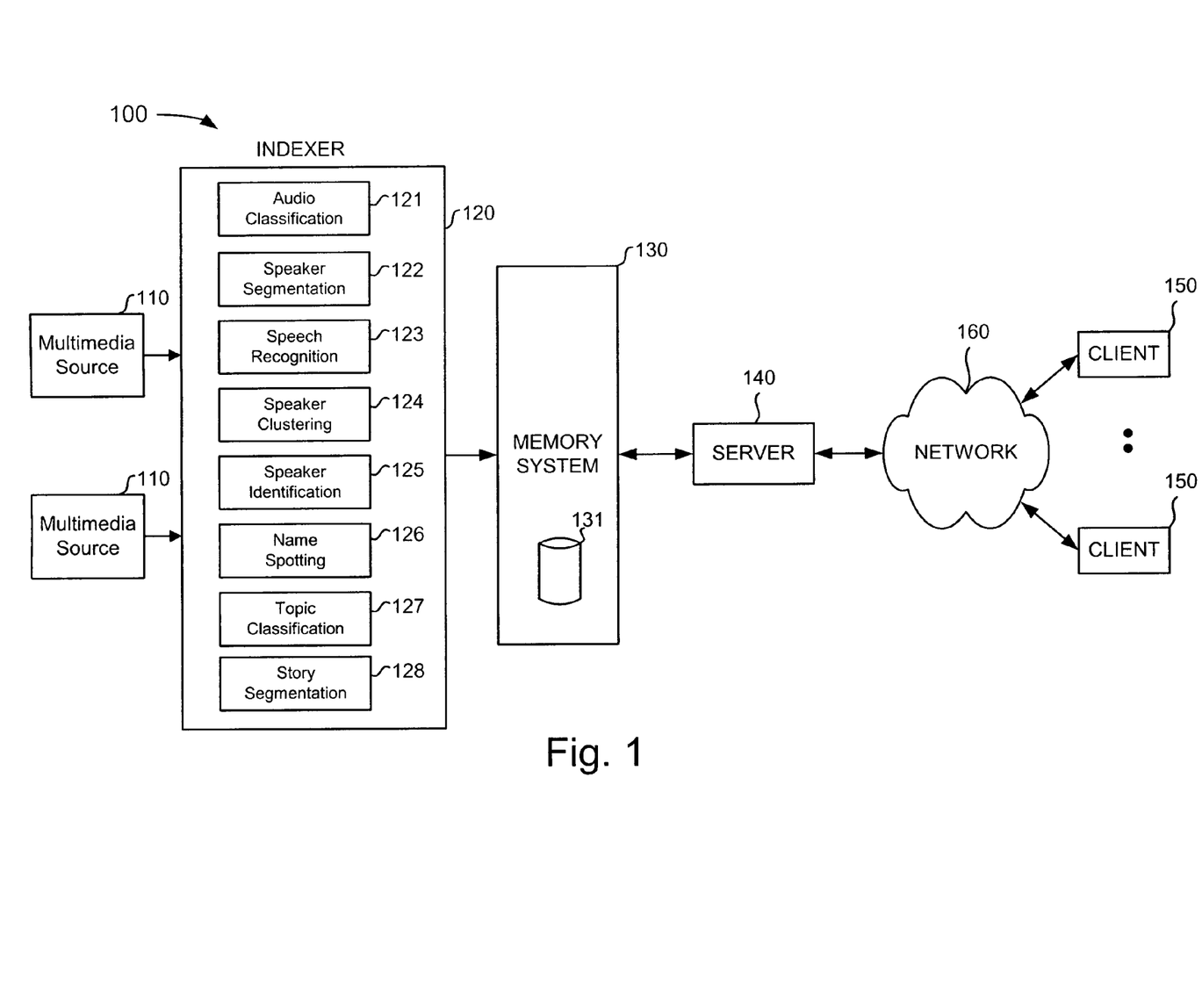
FIG. 1 is a diagram of a system in which systems and methods consistent with the present invention may be implemented.

FIG. 1 is a diagram of an exemplary system 100 in which systems and methods consistent with the present invention may be implemented. In general, system 100 provides indexing and retrieval of input audio for clients 150. For example, system 100 may index input speech data, create a structural summarization of the data, and provide tools for searching and browsing the stored data.

System 100 may include multimedia sources 110, an indexer 120, memory system 130, and server 140 connected to clients 150 via network 160. Network 160 may include any type of network, such as a local area network (LAN), a wide area network (WAN) (e.g., the Internet), a public telephone network (e.g., the Public Switched Telephone Network (PSTN)), a virtual private network (VPN), or a combination of networks. The various connections shown in FIG. 1 may be made via wired, wireless, and/or optical connections.

Multimedia sources 110 may include one or more audio sources, such as radio broadcasts, or video sources, such as television broadcasts. Indexer 120 may receive audio data from one of these sources as an audio stream or file.

Indexer 120 may receive the input audio data from multimedia sources 110 and generate a rich transcription therefrom. For example, indexer 120 may segment the input data by speaker, cluster audio segments from the same speaker, identify speakers by name or gender, and transcribe the spoken words. Indexer 120 may also segment the input data based on topic and locate the names of people, places, and organizations. Indexer 120 may further analyze the input data to identify when each word was spoken (possibly based on a time value). Indexer 120 may include any or all of this information as metadata associated with the transcription of the input audio data. To this end, indexer 120 may include audio classification logic 121, speaker segmentation logic 122, speech recognition logic 123, speaker clustering logic 124, speaker identification logic 125, name spotting logic 126, topic classification logic 127, and story segmentation logic 128.

Audio classification logic 121 initially classifies the audio from multimedia sources 110 into one of a number of broad classes (e.g., 7) in a manner consistent with the present invention. As previously mentioned, the audio classes may include: vowels, fricatives, narrowband, wideband, coughing, gender, and silence. The classified audio may then be used by logic 122-128 as each of these elements perform their individual functions. Audio classification logic 121 will be discussed in more detail below.

Speaker segmentation logic 122 detects changes in speakers. Speaker segmentation logic 122 may use the classes determined by audio classification logic 121. For example, changes in the gender of a speaker may indicate a speaker change.

Speech recognition logic 123 may use statistical models, such as acoustic models and language models, to process input audio data. Different acoustic and language models may be trained based on the different classes generated by audio classification logic 121. The language models may include n-gram language models, where the probability of each word is a function of the previous word (for a bi-gram language model) and the previous two words (for a tri-gram language model). Typically, the higher the order of the language model, the higher the recognition accuracy at the cost of slower recognition speeds. The language models may be trained on data that is manually and accurately transcribed by a human.

Speaker clustering logic 124 may identify all of the segments from the same speaker in a single document (i.e., a body of media that is contiguous in time (from beginning to end or from time A to time B)) and group them into speaker clusters. Speaker clustering logic 124 may then assign each of the speaker clusters a unique label. Speaker identification logic 125 may identify the speaker in each speaker cluster by name or gender.

Name spotting logic 126 may locate the names of people, places, and organizations in the transcription. Name spotting logic 126 may extract the names and store them in a database. Topic classification logic 127 may assign topics to the transcription. Each of the words in the transcription may contribute differently to each of the topics assigned to the transcription. Topic classification logic 127 may generate a rank-ordered list of all possible topics and corresponding scores for the transcription.

Story segmentation logic 128 may change the continuous stream of words in the transcription into document-like units with coherent sets of topic labels and other document features. This information may constitute metadata corresponding to the input audio data. Story segmentation logic 128 may output the metadata in the form of documents to memory system 130, where a document corresponds to a body of media that is contiguous in time (from beginning to end or from time A to time B).

In one implementation, logic 122-228 may be implemented in a manner similar to that described in John Makhoul et al., "Speech and Language Technologies for Audio Indexing and Retrieval," Proceedings of the IEEE, Vol. 88, No. 8, Aug. 2000, pp.1338-1353, which is incorporated herein by reference.

Memory system 130 may store documents from indexer 120. Memory system 130 may include one or more databases 131. Database 131 may include a conventional database, such as a relational database, that stores documents from indexer 120. Database 131 may also store documents received from clients 150 via server 140. Server 140 may include logic that interacts with memory system 130 to store documents in database 131, query or search database 131, and retrieve documents from database 131.

Server 140 may include a computer or another device that is capable of interacting with memory system 130 and clients 150 via network 160. Server 140 may receive queries from clients 150 and use the queries to retrieve relevant documents from memory system 130. Clients 150 may include personal computers, laptops, personal digital assistants, or other types of devices that are capable of interacting with server 140 to retrieve documents from memory system 130. Clients 150 may present information to users via a graphical user interface, such as a web browser window.

Typically, in the operation of system 100, audio streams are transcribed as rich transcriptions that include metadata that defines information, such as speaker identification and story segments, related to the audio streams. Indexer 120 generates the rich transcriptions. Clients 150, via server 140, may then search and browse the rich transcriptions.

Figure 2:
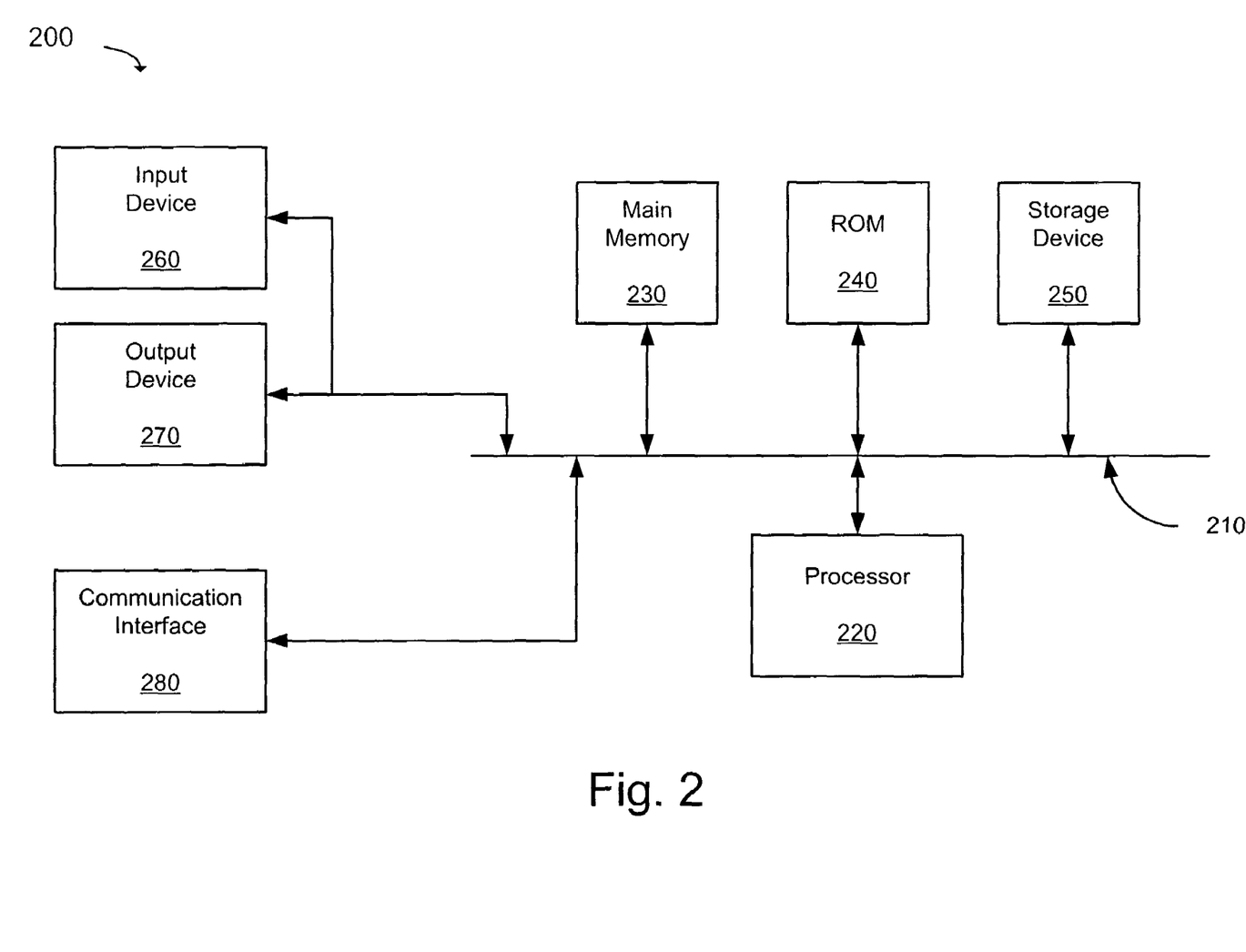
FIG. 2 is a diagram illustrating an exemplary computing device.

FIG. 2 is a diagram illustrating an exemplary computing device 200 that may correspond to server 140 or clients 150. Computing device 200 may include bus 210, processor 220, main memory 230, read only memory (ROM) 240, storage device 250, input device 260, output device 270, and communication interface 280. Bus 210 permits communication among the components of computing device 200.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit an operator to input information to computing device 200, such as a keyboard, a mouse, a pen, a number pad, a microphone and/or biometric mechanisms, etc. Output device 270 may include one or more conventional mechanisms that output information to the operator, including a display, a printer, speakers, etc. Communication interface 280 may include any transceiver-like mechanism that enables computing device 200 to communicate with other devices and/or systems. For example, communication interface 280 may include mechanisms for communicating with another device or system via a network, such as network 160.

Exemplary Processing

Figure 3:
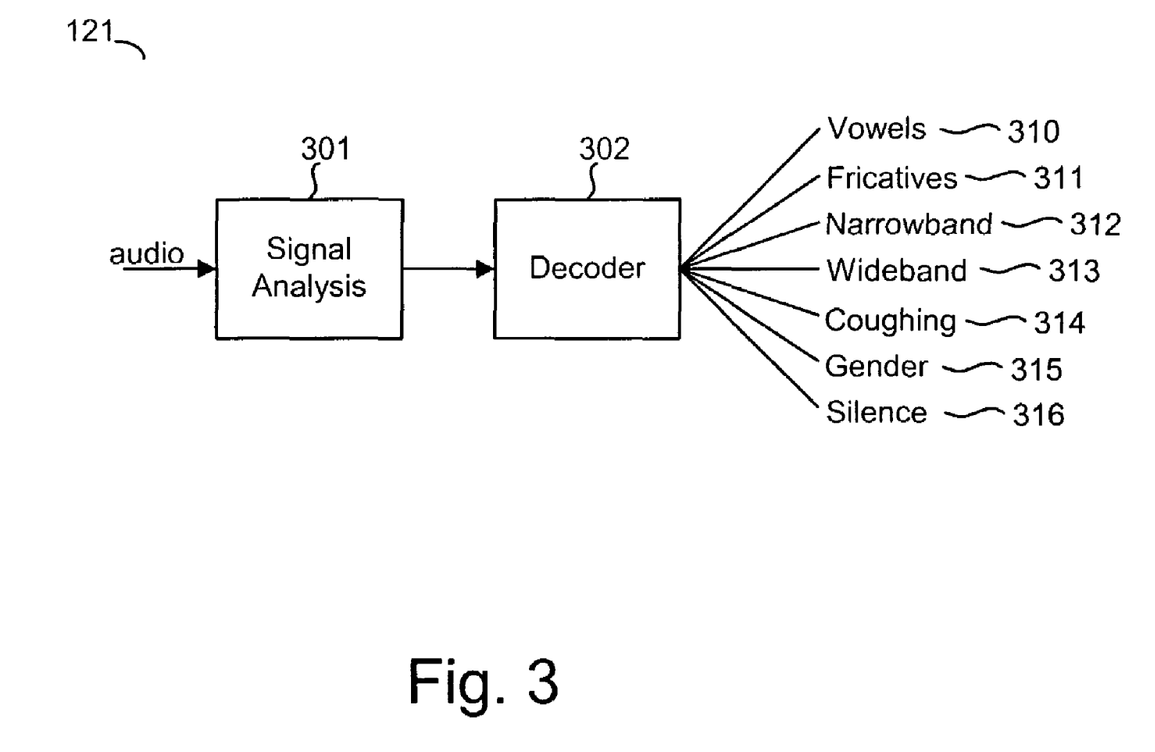
FIG. 3 is a diagram illustrating functional components of the audio classification logic shown in FIG. 1.

As previously mentioned, audio classification logic 221 classifies input audio streams into broad classes that can be used by logic 122-128 to improve speech recognition. FIG. 3 is a diagram illustrating functional components of audio classification logic 121. As shown, audio classification logic 121 includes signal analysis component 301 and decoder 302.

Signal analysis component 301 performs initial signal processing functions on the input audio stream. Signal analysis component 301 may convert the audio stream into a frequency domain signal and generate cepstral features for the audio. The conversion of an audio signal into the frequency domain and the calculation of cepstral features for an audio signal is well known in the art and will not be described in detail herein.

Decoder 302 receives the version of the audio stream processed by signal analysis component 301. Decoder 302 may generate an output signal that indicates the classification for a particular portion of the audio signal. The output signal may be a continuous signal or a signal that classifies the input audio signal in predetermined length segments (e.g., 10 ms). As shown in FIG. 3, the classifications generated by decoder 302 may include a vowel class 310, a fricative class 311, a narrowband class 312, a wideband class 313, a coughing class 314, a gender class 315, and a silence class 316.

Vowel class 310 may include sounds uttered by a speaker that would traditionally be classified as one of a number of phonemes that define vowel and nasal sounds. Fricative class 311 may include sounds uttered by a speaker that that would be traditionally be classified as one of a number of phonemes that define obstruents and fricatives (consonants).

Narrowband class 312 and wideband class 313 relate to the bandwidth of the input audio signal. Narrowband signals may be signals received over a medium such as a telephone line or a radio broadcast. Wideband signals are higher quality signals, such as an audio signal received via a high-quality satellite broadcast. Speech recognition logic 123 may use different language models depending on whether the audio signal is a wideband or narrowband signal.

Coughing class 314 indicates a class for sounds that relate to non-speech events, such as a coughing sound. Other sounds that may be included in coughing class 314 includes laughter, breath and lip-smack sounds.

Gender class 315 indicates whether a sound is likely to have been produced by a male speaker or a female speaker. Silence class 316 indicates silence.

Decoder 302 may use a Hidden Markov Model (HMM) to model each of the seven phone classes. HMMs are probability models defined by a finite number of states. Transitions among the states are governed by a set of probabilities, called transition probabilities. HMMs are generally well known in the art.

Figure 4:
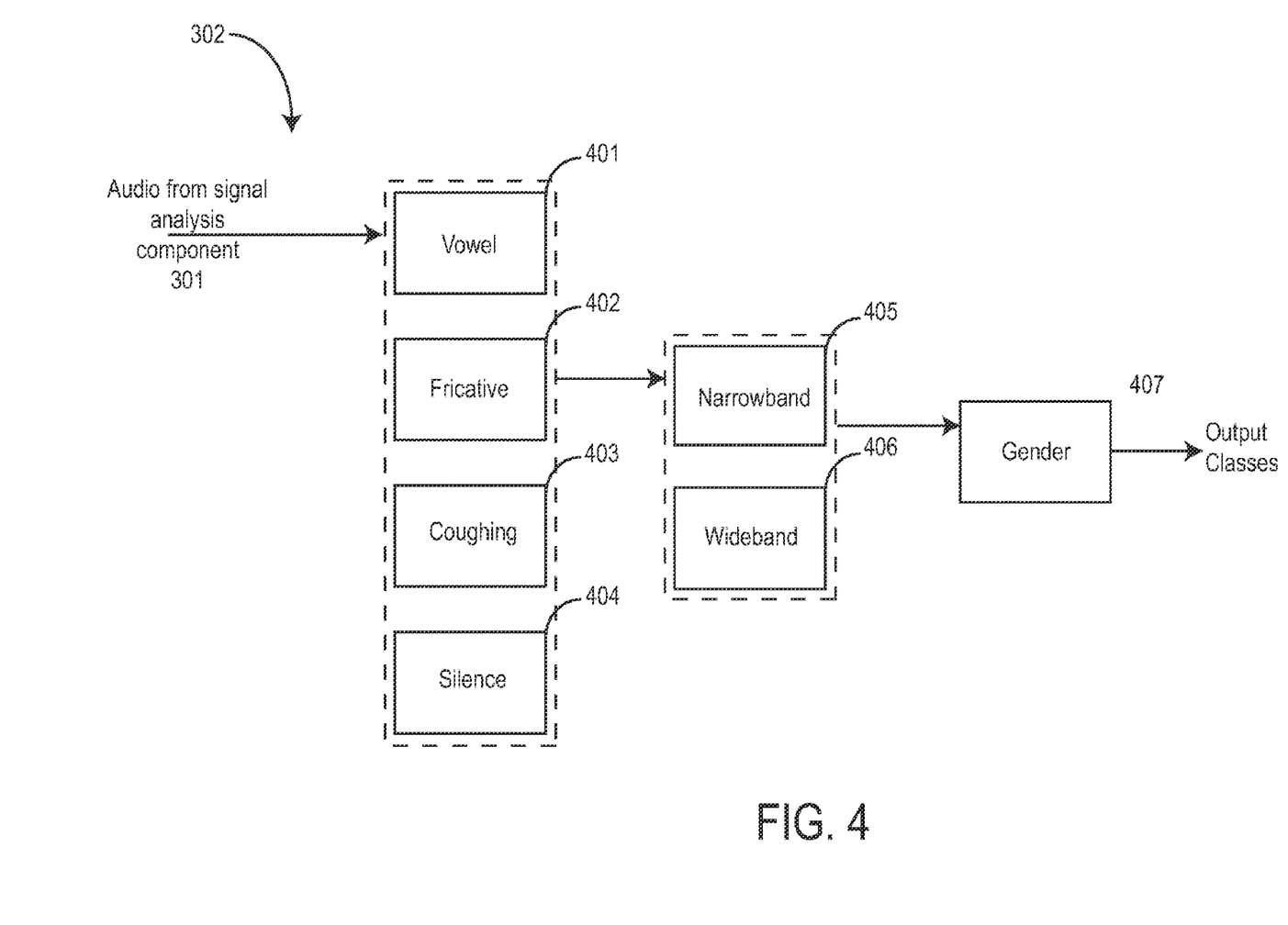
FIG. 4 is a diagram illustrating the decoder shown in FIG. 3 in additional detail.

FIG. 4 is a diagram illustrating decoder 302 in additional detail. Decoder 302 includes HMM based acoustic models for classifying the input audio streams. In particular, decoder 302 includes vowel model 401, fricative model 402, coughing model 403, silence model 404, narrowband model 405, wideband model 406, and gender model 407.

Vowel model 401, fricative model 402, and coughing model 403 may be phoneme based models. These models classify an audio signal based on rough phoneme classes. Vowel model 401 may, for example, determine if an input phoneme in the audio signal falls within what would conventionally be approximately 25 phonemes that relate to vowel sounds. Vowel model 401 does not need to determine which of the 25 conventional vowel phonemes corresponds to the input phoneme; only that the input phoneme falls within the vowel class of phonemes. Accordingly, vowel model 401 can be a less complicated and faster executing model than a model designed to determine the particular phoneme to which a sound corresponds.

Fricative model 402 and coughing model 403 may also be implemented as phoneme based models. In a manner similar to vowel model 401, these models determine whether sounds in the input audio signal correspond to any of the set of phonemes that correspond to these sounds. Fricative model 402, for example, may include approximately 18 conventional phonemes that define consonant sounds.

Silence model 404, narrowband model 405, wideband model 406, and gender model 407 may be implemented based on non-phoneme properties of the audio signal. In particular, these models may be based on a conditional analysis of the signal from signal analysis component 301. Narrowband model 405 and wideband model 406 may examine the frequencies present in the signal. Signals with a bandwidth greater than 8 kHz may be classified as wideband signals while those having a bandwidth less than 8 kHz may be classified as narrowband signals. Additionally, signals with very little energy may be classified as silence by silence model 104. Gender model 107 may examine the frequency distribution of the signal to make a determination as to whether the speaker is a male or female.

As shown in FIG. 4, models 401-407 may be logically arranged such that vowel model 401, fricative model 402, coughing model 403, and silence model 404 initially process the input audio signal to classify the signal as belonging to one of the vowel, fricative, coughing, or silence class. Narrowband model 405 and wideband model 406 may then further classify the signal as being a narrowband or wideband signal. Gender model 407 may then further classify speech portions of the input signal as emanating from a male or a female speaker.

Figure 5:
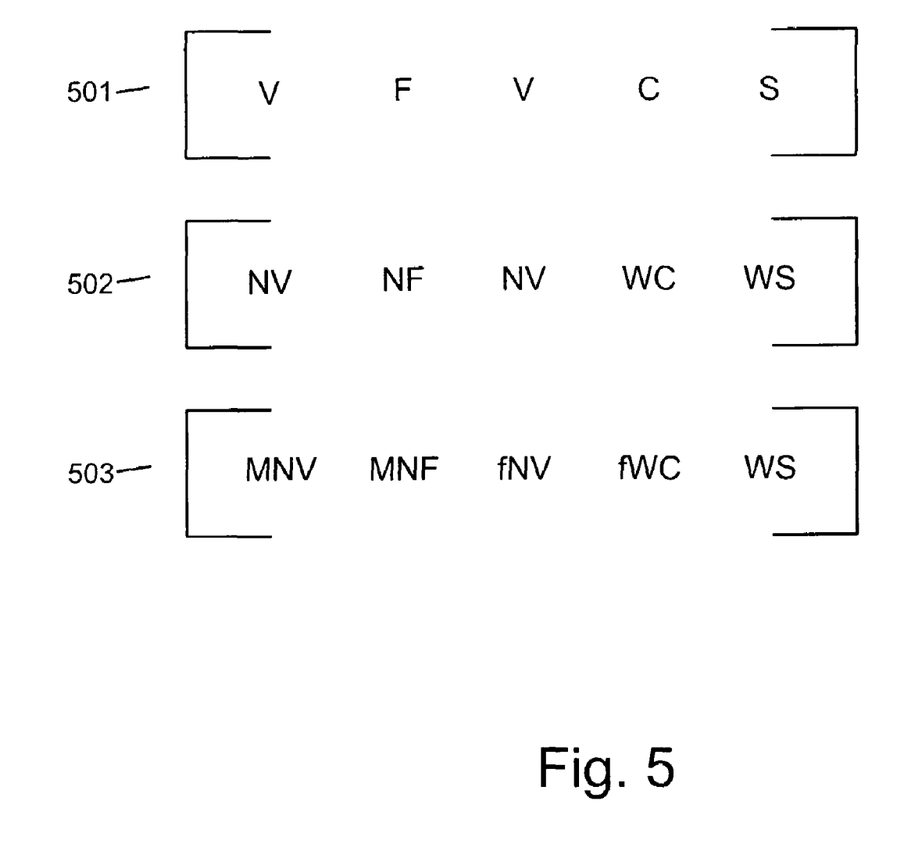
FIG. 5 is a diagram illustrating an exemplary sequence of output classification symbols.

The output of decoder 302 may include a sequence of symbols that represent the classification results by models 401-407. FIG. 5 is a diagram illustrating an exemplary sequence of output symbols. In FIG. 5, "V" represents the vowel class, "F" represents the fricative class, "C" represents the coughing class, "S" represents the silence class, "W" represents a wideband signal, "N" represents a narrowband signal, "m" denotes a male gender classification, and "f" denotes a female gender classification. Symbol set 501 includes an exemplary series of five output symbols generated by the first stage of decoder 302 (i.e., models 401-404). Each of the symbols in set 501 may be associated with a start time within the input audio signal and a duration period. As shown, set 501 includes a vowel phoneme, a fricative phoneme, a vowel phoneme, a coughing sound, and silence. Symbol set 502 includes the symbols of set 501 after additionally being processed by models 405 and 406. The first symbol of symbol set 502, for example, is a vowel phoneme that is a narrowband signal. At the fourth symbol of symbol set 502, the signal switches to a wideband signal. Symbol set 503 includes the symbols of set 502 after additionally being processed by model 407. The first symbol of symbol set 503, for example, is a narrowband vowel phoneme that was spoken by a male.

Figure 6:
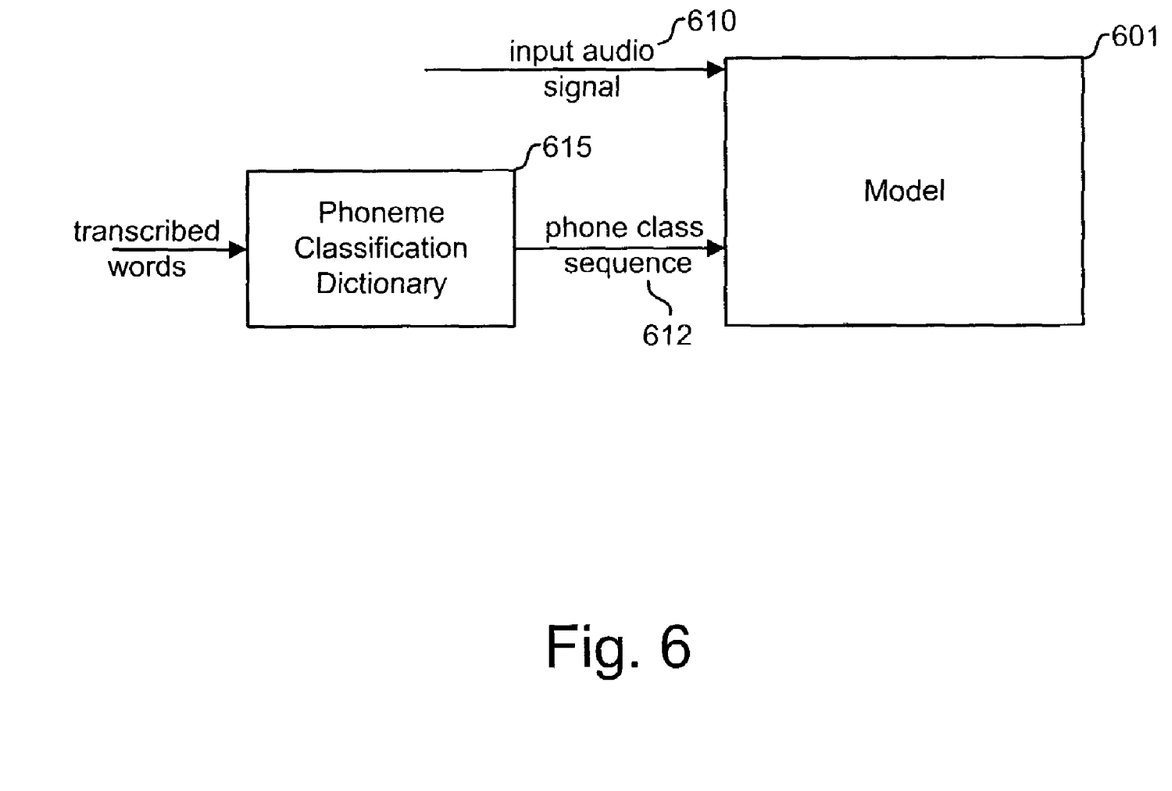
FIG. 6 is a diagram illustrating training of a phoneme based model consistent with an implementation of the invention.

FIG. 6 is a diagram illustrating training of a phoneme based model 601 consistent with an implementation of the invention. Model 601 may correspond to any one of models 401-403.

Model 601 may be trained using a recorded stream(s) of audio data that includes speech. The audio stream is passed through signal analysis component 301 and the resultant signal, labeled as input audio signal 610, is received by model 601. Additionally, model 601 receives a phone class sequence 612 (i.e., vowels, fricatives, or coughing) corresponding to the input signal 610. The phone class sequence 612 may be derived based on a meticulous manual transcription of the speech corresponding to input signal 610. Phoneme class dictionary 615 may be used to convert the transcribed words into the appropriate phoneme classes. Phoneme dictionaries that list the phonemes corresponding to a word are well known in the art. Phoneme class dictionary 615 may be implemented as a conventional phoneme dictionary that further converts the looked-up phonemes to their respective phoneme classes.

Model 601 may include HMMs. The HMMs are trained based on the input audio signal 610 and the phone class sequence 612 using conventional HMM training techniques.

Figure 7:
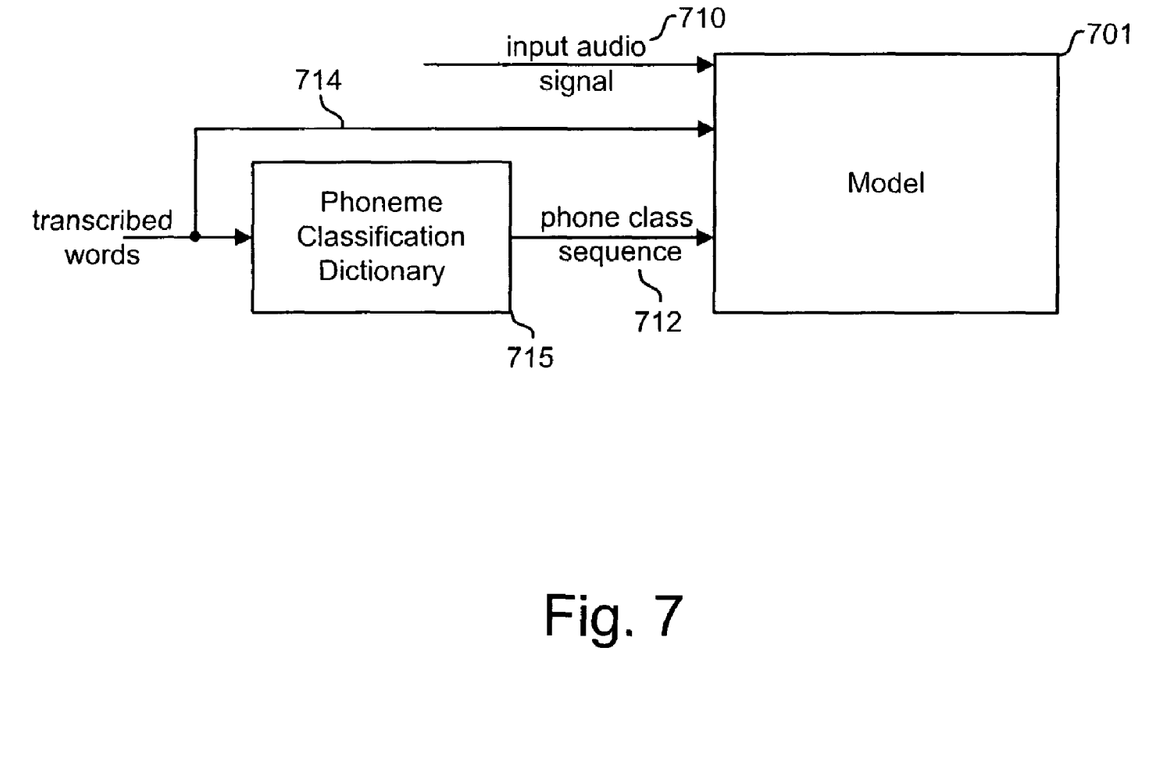
FIG. 7 is a diagram illustrating training of a phoneme based model consistent with another implementation of the invention.

FIG. 7 is a diagram illustrating training of a phoneme based model 701 consistent with another implementation of the invention. Model 701 may correspond to any one of models 401-403.

Model 701 may be trained using a recorded stream(s) of audio data that includes speech. Input audio signal 710 is similar to input audio signal 610. In particular, input audio signal 710 is an audio stream that contains speech data and is passed through signal analysis component 301. Additionally, as with model 601, model 701 receives a phone class sequence 712 generated by phone class dictionary 715 from transcribed speech. Phone class dictionary 715 is implemented identically to phone class dictionary 615.

In addition to the phoneme class sequence 712, model 701 receives information relating to the transcribed words, labeled as input 714. By receiving the transcribed words, as well as the phoneme class sequence 712, model 701 can determine which of the boundaries between the phone classes correspond to word boundaries. Stated differently, model 701 retains word boundary markings in the input phoneme classification, while model 601 simply receives a continuous stream of phoneme classifications. In some situations, this can lead to a more accurate model.

As with model 601, model 701 may include HMMs. The HMMs are trained based on the input audio signal 710, the phone class sequence 712, and the word boundaries derived from input words 714.

HMM based models 601 and 701 have been found to be trainable based on multiple languages.

CONCLUSION

The audio classification system, as described herein, classifies audio that includes speech data into a number of broad classes. Phoneme and condition models are used to perform the classifications. The classification information can be used to improve speech recognition.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while seven broad classes were considered by decoder 302, in other implementations, more or fewer classes could be used.

Certain portions of the invention have been described as software that performs one or more functions. The software may more generally be implemented as any type of logic. This logic may include hardware, such as application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method for classifying an audio signal containing speech information, the method comprising:
   receiving the audio signal;
   classifying a sound in the audio signal as a vowel class when a first phoneme-based model determines that the sound corresponds to a sound represented by a set of phonemes that define vowels;
   classifying the sound in the audio signal as a fricative class when a second phoneme-based model determines that the sound corresponds to a sound represented by a set of phonemes that define consonants; and
   classifying the sound in the audio signal based on at least one non-phoneme based model, the at least one non-phoneme based model including at least one model for classifying the sound in the audio signal based on bandwidth.

2. The method of claim 1, further comprising:
   classifying the sound in the audio signal as belonging to one of the vowel class, the fricative class, a coughing class, and a silence class;
   classifying the sound in the audio signal as belonging to one of a narrowband class and a wideband class after classifying the sound in the audio signal in the one of the vowel class, the fricative class, the coughing class, and the silence class; and
   classifying the sound in the audio signal as belonging to one of a male class and a female class after classifying the sound in the audio signal in the one of the narrowband class and the wideband class;
   wherein the at least one non-phoneme based model includes models for classifying the sound in the audio signal based on speaker gender.

3. The method of claim 1, wherein the at least one non-phoneme based model includes a model for classifying the sound in the audio signal as silence.

4. The method of claim 1, further comprising:
   initially converting the audio signal into a frequency domain signal.

5. The method of claim 1, further comprising:
   generating cepstral features for the audio signal.

6. The method of claim 1, wherein the fricative class includes phonemes that relate to fricatives and obstruents.

7. The method of claim 1, wherein the first and second phoneme-based models are Hidden Markov Models.

8. The method of claim 1, further comprising:
   classifying the sound in the audio signal as a coughing class when the sound corresponds to a non-speech sound.

9. The method of claim 8, wherein the non-speech sound includes at least one of coughing, laughter, breath, and lip-smack.

10. A method of training audio classification models, the method comprising:
    receiving a training audio signal;
    receiving phoneme classes corresponding to the training audio signal;
    training a first Hidden Markov Model (HMM), based on the training audio signal and the phoneme classes, to classify speech as belonging to a vowel class when the first HMM determines that the speech corresponds to a sound represented by a set of phonemes that define vowels;
    training a second HMM, based on the training audio signal and the phoneme classes, to classify speech as belonging to a fricative class when the second HMM determines that the speech corresponds to a sound represented by a set of phonemes that define consonants; and
    training at least one model to classify the sound based on a bandwidth of the sound.

11. The method of claim 10, wherein the phoneme classes include information that defines word boundaries.

12. The method of claim 11, wherein the method further comprises:
    receiving a sequence of transcribed words corresponding to the audio signal; and
    generating the information that defines the word boundaries based on the transcribed words.

13. The method of claim 10, further comprising:
    training at least one model to classify the sound based on gender of a speaker of the sound.

14. The method of claim 10, wherein the fricative class includes phonemes that relate to fricatives and obstruents.

15. An audio classification device comprising:
    a signal analysis component configured to receive an audio signal and process the audio signal by at least one of the converting the audio signal to the frequency domain and generating cepstral features for the audio signal; and
    a decoder configured to classify portions of the audio signal as belonging to at least one of the plurality of classes, the classes including
    a first phoneme-based class that applies to the audio signal when a portion of the audio signal corresponds to a sound represented by a set of phonemes that define vowels,
    a second phoneme-based class that applies to the audio signal when a portion of the audio signal corresponds to a sound represented by a set of phonemes that define consonants, and
    at least one non-phoneme class;
    wherein the decoder determines the at least one non-phoneme class using models that classify the portions of the audio signal based on bandwidth.

16. The audio classification device of claim 15, wherein the second phoneme-based class includes fricative phonemes and obstruent phonemes.

17. The audio classification device of claim 15, wherein the first and second phoneme-based classes are determined based on hidden Markov Models.

18. The audio classification device of claim 15, wherein the decoder determines the at least one non-phoneme class using models that classify the portions of the audio signal based on speaker gender;
    wherein the decoder is configured to classify portions of the audio signal as belonging to one of the vowel class, the fricative class, a coughing class, and a silence class;
    wherein the decoder is configured to classify the portions of the audio signal as belonging to one of a narrowband class and a wideband class after the decoder classifies the portions of the audio signal in one of the vowel class, fricative class coughing class, and silence class; and
    wherein the decoder is configured to classify the portions of the audio signal as belonging to one of a male class and a female class after the decoder classifies the portions of the audio signal in one of the narrowband class and wideband class.

19. The audio classification device of claim 15, wherein the decoder determines the at least one non-phoneme class using a model that classifies the portions of the audio signal as silence.

20. The audio classification device of claim 15, wherein the plurality of classes additionally include:
a third phoneme-based class that applies to the audio signal when a portion of the audio signal corresponds to a non-speech sound.

21. The audio classification device of claim 20, wherein the non-speech sound includes at least one of the coughing, laughter, breath, and lip-smack.

22. A system comprising:
an indexer configured to receive input audio data and generate a rich transcription from the audio data, the indexer including:
audio classification logic configured to classify the input audio data into at least one of a plurality of broad audio classes, the broad audio classes including a phoneme-based vowel class, a phoneme-based fricative class, a non-phoneme based bandwidth class, and a non-phoneme based gender class,
a speech recognition component configured to generate the rich transcription based on the broad audio classes determined by the audio classification logic;
a memory system for storing the rich transcription; and
a server configured to receive requests for documents and respond to the requests by transmitting one or more of the rich transcriptions that match the requests.

23. The system of claim 22, wherein the broad audio classes further include a phoneme-based coughing class;
wherein the audio classification logic is configured to classify the input audio data as belonging to one of the vowel class, the fricative class, the coughing class, and a silence class;
wherein the audio classification logic is configured to classify the input audio data as belonging to one of a narrowband class and a wideband class after the audio classification logic classifies input audio data in one of the vowel class, fricative class coughing class, and silence class; and
wherein the audio classification logic is configured to classify the input audio data as belonging to one of a male class and a female class after the audio classification logic classifies the input audio data in one of the narrowband class and wideband class.

24. The system of claim 23, wherein the coughing class includes sounds relating to coughing, laughter, breath, and lip-smack.

25. The system of claim 22, wherein the phoneme-based fricative class includes phonemes that define fricative or obstruent sounds.

26. The system of claim 22, wherein the indexer further includes at least one of: a speaker clustering component, a speaker identification component, a name spotting component, and a topic classification component.

27. A device comprising:
means for classifying a sound in an audio signal as a vowel class when a first phoneme-based model determines that the sound corresponds to a sound represented by a set of phonemes that define vowels;
means for classifying the sound in the audio signal as a fricative class when a second phoneme-based model determines that the sound corresponds to a sound represented by a set of phonemes that define consonants; and
means for classifying the sound in the audio signal based on at least one non-phoneme based model, the at least one non-phoneme based model including at least one model for classifying the sound in the audio signal based on bandwidth.

28. The device of claim 27, further comprising:
means for converting the audio signal into a frequency domain signal.

29. The device of claim 27, further comprising:
means for generating cepstral features for the audio signal.

30. The device of claim 27, further comprising:
means for in the sound in the audio signal as belonging to one of the vowel class, the fricative class, a coughing class, and a silence class when the sound corresponds to a non-speech sound;
means for classifying the sound in the audio signal as belonging to one of a narrowband class and a wideband class after classifying the sound in the audio signal in the one of the vowel class, the fricative class, the coughing class, and the silence class; and
means for classifying the sound in the audio signal as belonging to one of a male class and a female class after classifying the sound in the audio signal in the one of the narrowband class and the wideband class.

31. The method of claim 10, further comprising:
training at least one model to classify the sound as belonging to one of the vowel class, the fricative class, a coughing class, and a silence class;
training at least one model to classify the sound as belonging to one of a narrowband class and a wideband class after classifying the sound in the one of the vowel class, the fricative class, the coughing class, and the silence class; and
training at least one model to classify the sound as belonging to one of a male class and a female class after classifying the sound in the audio signal in the one of the narrowband class and the wideband class.

* * * * *